(12) United States Patent
Idies

(10) Patent No.: US 9,956,733 B2
(45) Date of Patent: May 1, 2018

(54) SEALING BELLOWS, METHOD FOR THE PRODUCTION THEREOF AND SEALING BELLOWS ARRANGEMENT

(71) Applicant: Carl Freudenberg KG, Weinheim (DE)

(72) Inventor: Nedal Idies, Berlin (DE)

(73) Assignee: Carl Freudenberg KG, Weinheim (DE)

(*) Notice: Subject to any disclaimer, the term of this patent is extended or adjusted under 35 U.S.C. 154(b) by 677 days.

(21) Appl. No.: 14/571,373

(22) Filed: Dec. 16, 2014

(65) Prior Publication Data

US 2015/0102534 A1    Apr. 16, 2015

Related U.S. Application Data

(62) Division of application No. 14/029,832, filed on Sep. 18, 2013, now Pat. No. 9,221,225.

(30) Foreign Application Priority Data

Sep. 20, 2012 (DE) .................. 10 2012 018 586

(51) Int. Cl.
  *B29C 49/56* (2006.01)
  *B29D 99/00* (2010.01)
  (Continued)

(52) U.S. Cl.
  CPC .......... *B29D 99/0053* (2013.01); *B29C 49/48* (2013.01); *B29C 49/56* (2013.01);
  (Continued)

(58) Field of Classification Search
  None
  See application file for complete search history.

(56) References Cited

U.S. PATENT DOCUMENTS 2,397,464 A    4/1946   Booth
4,017,197 A    4/1977   Farrant
(Continued)

FOREIGN PATENT DOCUMENTS

DE          4304774 A1      8/1994
DE      102006039861 A1     3/2008
WO    WO 2004038237 A1      5/2004

OTHER PUBLICATIONS

U.S. Appl. No. 14/029,832, filed Sep. 18, 2013.

*Primary Examiner* — Monica Huson
(74) *Attorney, Agent, or Firm* — Leydig, Voit & Mayer, Ltd.

(57) ABSTRACT

A method for producing a sealing bellows, involving (1) vulcanizing a sealing bellows having clamping elements integrated into the sealing region and into the attachment region (2) and having a substantially cylindrical casing, thereby forming the sealing bellow; (2) interrupting the vulcanizing after the mold cavity has been filled and after attaining dimensional stability of the sealing bellows and then releasing the sealing bellows from the mold; (3) introducing the sealing bellows having a substantially cylindrical casing into a heated blowing mold having a substantially spherical cavity and sealing the blowing mold in an airtight manner; (4) subjecting the interior of the sealing bellows to a relative excess pressure such that the casing is applied against a wall delimiting the cavity of the blowing mold; and (5) completely curing the sealing bellows, then opening the blowing mold to release the sealing bellows from the mold.

3 Claims, 4 Drawing Sheets

(51) Int. Cl.
  *F16C 11/06* (2006.01)
  *F16J 3/04* (2006.01)
  *B29C 49/48* (2006.01)
  *F16J 15/52* (2006.01)

(52) U.S. Cl.
  CPC .......... *F16C 11/06* (2013.01); *F16C 11/0666* (2013.01); *F16J 3/042* (2013.01); *F16J 15/525* (2013.01); *B29C 2049/563* (2013.01); *Y10T 403/315* (2015.01); *Y10T 403/32729* (2015.01)

(56) References Cited

U.S. PATENT DOCUMENTS

| | | |
|---|---|---|
| 4,572,693 A | 2/1986 | Nemoto |
| 4,650,362 A | 3/1987 | Kubo |
| 2003/0156894 A1 | 8/2003 | Suzuki et al. |
| 2003/0202842 A1 | 10/2003 | Abels |
| 2005/0105961 A1 | 5/2005 | Kondoh |
| 2009/0209353 A1 | 8/2009 | Abels et al. |

SEALING BELLOWS, METHOD FOR THE PRODUCTION THEREOF AND SEALING BELLOWS ARRANGEMENT

CROSS-REFERENCE TO RELATED APPLICATIONS

The present is a divisional application based on U.S. application Ser. No. 14/029,832, which is incorporated herein in its entirety by reference. Priority is also claimed to German Patent Application No. DE 10 2012 018 586.3, filed on Sep. 20, 2012, which is also incorporated by reference herein.

FIELD

The present application relates to a method for the production of a sealing bellows arrangement.

The sealing bellows has at one end a sealing region on the end face, at the other end an attachment region on the end face and a casing arranged in the axial direction between the sealing region and the attachment region, the casing, the sealing region and the attachment region being configured such that they merge integrally into one another, they are composed of a flexible rubber material and a respective clamping element is integrated into the sealing region and into the attachment region.

BACKGROUND

A sealing bellows of this type is known from DE 10 2006 039 861 A1 and is used, for example, in motor vehicles to seal a ball joint. The sealing bellows prevents grime and moisture from penetrating inside the ball joint to ensure a low maintenance intensity and a long service life of the ball joint. The sealing bellows is composed of a flexible rubber material, the clamping elements for fixing the bellows onto a respective machine element being integrated into the sealing region and into the attachment region. The sealing region is mounted by its clamping element on the ball pivot and it rests against the lever holder of the ball joint, whereas the attachment region is fixed on the housing of the ball joint by its clamping element. In this respect, the ball pivot, the lever holder and the ball of the ball joint are mounted such that they can pivot and rotate relative to the housing of the ball joint.

The casing of the sealing bellows can be subjected to tension, compression or flexion.

The previously known sealing bellows is produced in a forming process, for example in the injection molding process. The casing is configured to be substantially cylindrical as a condition of production in order to be demolded from the injection molding machine in a true condition. The production-conditioned substantially cylindrical casing is only bulged radially outwards when the sealing bellows is assembled on the ball joint and, as a result, the casing generates high axial forces. The axial forces increase the contact force of the end face of the sealing region of the sealing bellows against the lever holder to an undesirable extent, the increased contact pressure resulting in an increased wear primarily on the sealing region.

SUMMARY

An aspect of the invention provides a method of producing a sealing bellows, the method comprising: forming, in a vulcanization process, the sealing bellows including a sealing region, an attachment region, and a substantially cylindrical casing that is disposed, in an axial direction of the bellows, between the sealing region and the attachment region, the sealing region being formed with an integrated first clamping element, and the attachment region being formed with an integrated second clamping element; interrupting the vulcanization process after a mold cavity for the sealing bellows has been filled and after dimensional stability of the sealing bellows has been attained, and releasing the sealing bellows from the mold cavity; introducing the sealing bellows with the substantially cylindrical casing into a heated blowing mold having a substantially spherical cavity, the blowing mold being sealed in an airtight manner; subjecting an interior of the sealing bellows to a relative excess pressure such that the casing is applied against a wall delimiting the cavity of the blowing mold and forms a substantially spherical casing; curing the sealing bellows completely; and then opening the blowing mold and releasing the sealing bellows having the substantially spherical casing from the blowing mold.

BRIEF DESCRIPTION OF THE DRAWINGS

The present invention will be described in even greater detail below based on the exemplary figures, which are schematic. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
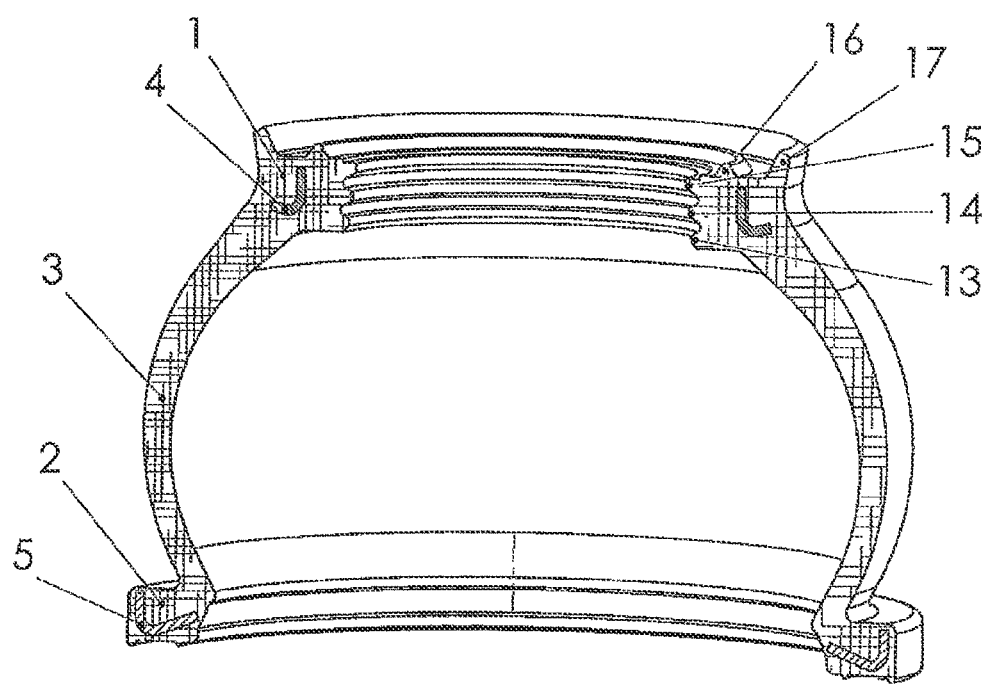
FIG. 1 is a sectional and perspective view of an embodiment of the sealing bellows according to the invention in its production-conditioned form.

An aspect of the invention provides a sealing bellows of the previously known type and a method for the production thereof such that the sealing bellows exhibits improved performance characteristics during a relatively long service life. In particular, the magnitude of the axial force acting on the sealing region during the intended use of the sealing bellows and the bulging of the casing in the radial direction are to be substantially independent of one another.

An aspect of the invention provides that the casing is configured to be substantially spherical as a condition of production, that the first clamping element has a first internal diameter in the sealing region, the second clamping element has a second internal diameter in the attachment region and the casing has a third greatest internal diameter and that the third greatest internal diameter is respectively greater than the first internal diameter and the second internal diameter as a condition of production.

Here, it is an advantage that the radial bulging of the casing is not produced by assembly on the ball joint, in particular by the axial compression of the sealing bellows, as in the case of the sealing bellows of the prior art, but the substantially spherical shape of the casing is a condition of production.

A sealing bellows of this type could not be produced by previously known forming processes, for example by a conventional injection molding process. As a result of the considerable radial bulging of the casing and due to the fact that the third greatest internal diameter of the casing is respectively greater than the first and second internal diameters, it would no longer be possible for a sealing bellows of this type to be released from the cavity of the mold in a conventional injection molding process.

Since the casing is already substantially spherical as a condition of production and a spherical shape of this type of the casing is not produced only by the axial compression of the sealing bellows, in particular the dynamically stressed sealing region is only exposed to low mechanical stresses. The axial forces with which the sealing region rests against the lever holder of a ball joint can be provided virtually irrespective of the shape of the casing so that on the one hand the seal on the lever holder functions in a reliable manner and on the other, the axial forces are no greater than is absolutely necessary for a good sealing effect in this region. As a result, the sealing region only exhibits minimum wear during the intended use of the sealing bellows. Therefore, the sealing region has consistently good use characteristics during a long service life.

The casing can be configured in the shape of an onion as a condition of production. An onion shape of this type has proved to be successful for sealing bellows. A casing configured in this manner can effectively withstand tensile, compressive or flexural stresses and therefore has a good durability. This durability is increased in that since the casing is already substantially spherical as a condition of production, it is only subjected to relatively low axial forces during the intended use.

The clamping elements could be composed of a hard, tough material and could be completely surrounded by the flexible rubber material of the sealing region and of the attachment region. The clamping elements can be composed of, for example, a metallic material or a polymeric material. Due to the integration of the clamping elements into the sealing region and into the attachment region, the respective clamping elements are protected against corrosion, loss or mechanical damage, for example due to stone chips. It is also advantageous that due to the integration of the clamping elements, there is no risk of damage to the sealing region and the attachment region due to the assembly of external clamping elements.

In the method according to the invention, in a first step, a sealing bellows having clamping elements integrated into the sealing region and into the attachment region and having a substantially cylindrical casing is produced by vulcanization in a forming process, the vulcanization process being interrupted after the mold cavity has been filled and after the dimensional stability of the sealing bellows has been attained and the sealing bellows is then released from the mold and, in a second step, the sealing bellows having a substantially cylindrical casing is introduced into a heated blowing mold having a substantially spherical cavity and the blowing mold is sealed in an airtight manner and, in a third step, the interior of the sealing bellows is subjected to a relative excess pressure such that the casing is applied against the wall delimiting the cavity of the blowing mold and, in a fourth step, the sealing bellows is completely cured, the blowing mold is then opened and the sealing bellows having the substantially spherical casing as a condition of production is released from the mold.

In a method of this type, it is advantageous that sealing bellows can be produced which have an undercut as a condition of production. It is impossible to produce sealing bellows of this type only by a conventional injection molding process. As previously stated, the method according to the invention makes it possible to produce sealing bellows in which only such a calculated axial force acts on the sealing region as is necessary in order to be able to provide a seal in a reliably dynamic manner in this region.

In the first step of the method, the sealing bellows can be produced by an injection molding process. Injection molding processes are established forming processes which can be implemented with a high level of process reliability.

In the third step of the method, the interior of the sealing bellows can be subjected to compressed air. Compressed air for the production of a relative excess pressure is readily and economically available and is particularly environmentally compatible.

The invention also relates to a sealing bellows arrangement, comprising a sealing bellows according to the invention, as previously described, the sealing region contacting a ball pivot and a lever holder of a ball joint in a relatively movable manner, resting thereon and sealing them dynamically, and the attachment region contacting a housing of the ball joint in a relatively stationary manner, resting thereon and sealing it.

In a sealing bellows arrangement of this type, the ball joint is protected particularly reliably against external contaminants during a long service life. The sealing bellows is only subjected to low mechanical stresses, in particular to an axial pressure during its intended use, because the sealing bellows is configured to be substantially spherical as a condition of production. The spherical form is not obtained, as in the prior art, by compressing a substantially cylindrical sealing bellows in the axial direction.

The sealing region can surround in a sealing manner the ball pivot with at least one radial sealing lip arranged radially inside and/or can contact in a sealing manner the lever holder with at least one axial sealing lip arranged on the end face. More preferably, the sealing region can be provided with three radial sealing lips which are arranged radially inside and are associated with one another adjacently in an axial spacing. These radial sealing lips surround the ball pivot in a sealing manner. Furthermore, two axial sealing lips which are arranged on the end face and are associated with one another adjacently in a radial spacing are preferably used. Due to the increased number of radial sealing lips and axial sealing lips, the ball joint is protected particularly effectively against contaminants and against a reduced service life which is a result thereof.

FIG. 1 shows an embodiment of the sealing bellows according to the invention in the production-conditioned form thereof.

At one end, the sealing bellows has the sealing region 1 on the end face and has at the other end the attachment region 2 on the end face. The sealing region 1 comprises three radial sealing lips 13, 14 15 which are arranged radially inside, adjacently to one another with an axial spacing and comprises two axial sealing lips 16, 17 which are associated with one another adjacently with a radial spacing. Integrated into the sealing region 1 is the first clamping element 4 which is substantially L-shaped and is composed of a hard, tough material, for example a metallic material. The first clamping element 4 is completely surrounded by the flexible rubber material of the sealing region 1 just as the second clamping element 5 is completely surrounded by the flexible rubber material of the attachment region 2. The clamping elements 4, 5 are provided in order to be able to securely attach the sealing region 1 and the attachment region 2 to a respective machine element, as will be explained in more detail in the following with reference to FIG. 2.

As a result of its spherical casing 3, the sealing bellows has an undercut which cannot be produced alone by conventional forming processes, such as by injection molding.

Due to the substantially spherical casing 3, the sealing bellows, already in its production-conditioned form, is able to absorb, in an effective and lasting manner, all stresses which act thereon during its intended use. In particular, the axial prestress with which the axial sealing lips 16, 17 rest against a surface to be sealed of a machine element can be adjusted to be ideal for the respective case of use; the axial contact pressure of the axial sealing lips 16, 17 on the machine element to be sealed does not have to be produced by compressing the casing into a spherical shape.

Figure 2:
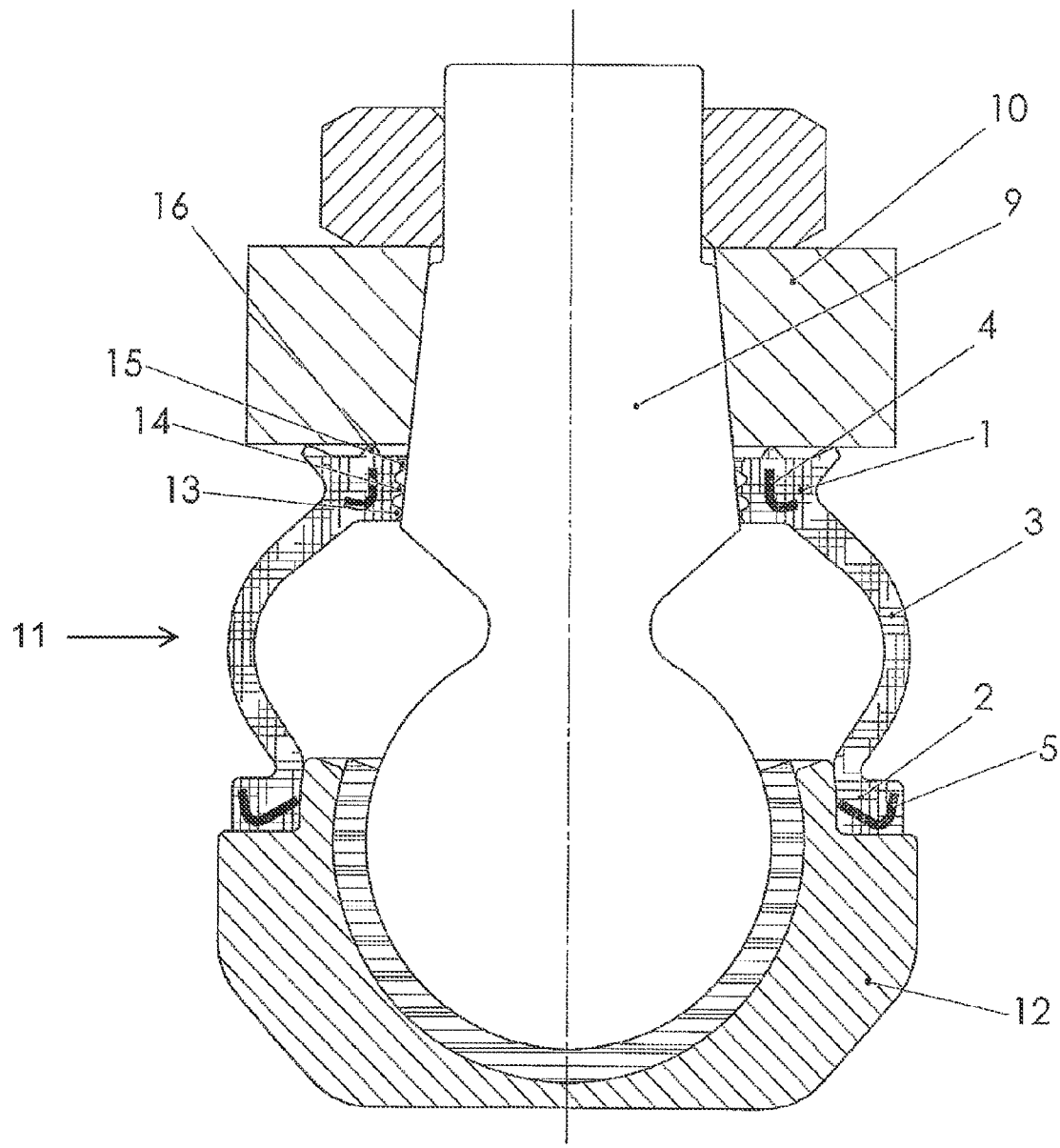
FIG. 2 shows an embodiment of a sealing bellows arrangement according to the invention, the sealing bellows of FIG. 1 being used to seal a ball joint.

FIG. 2 shows an embodiment of a sealing bellows arrangement in which the sealing bellows of FIG. 1 is used. With its sealing lips 13, 14, 15, the sealing region 1 surrounds the ball pivot 9 with radial pretension. On the other hand, the lever holder 10 of the ball joint 11 is sealed dynamically by the two axial sealing lips 16, 17 which are arranged on the end face.

The casing 3 is substantially spherical as a condition of production and has a third greatest internal diameter 8 which, as a condition of production, is respectively greater than the first internal diameter 6 of the first clamping element 4 and is greater than the second internal diameter 7 of the second clamping element 5. Consequently, the casing 3 is configured in the shape of an onion as a condition of production.

The attachment region 2 statically seals off the housing 12 of the ball joint 11. A secure fixing of the sealing region 1 on the ball pivot 9 and of the attachment region 2 on the housing 12 is produced by the clamping elements 4, 5 in the respective regions 1, 2.

In contrast to the sealing bellows of the prior art, a high axial force is not required to compress the casing 3 into a spherical shape. Since the casing is already onion-shaped due to production, the axial force by which the axial sealing lips 16, 17 are applied against the end face of the lever holder 10 is relatively low. This results in a long service life of the axial sealing lips 16, 17. Overall, this means that consistently good performance characteristics of the sealing bellows are provided over a long service life.

The method for the production of the sealing bellows of FIG. 1 will be described in more detail with reference to FIGS. 3 and 4.

Figure 3:
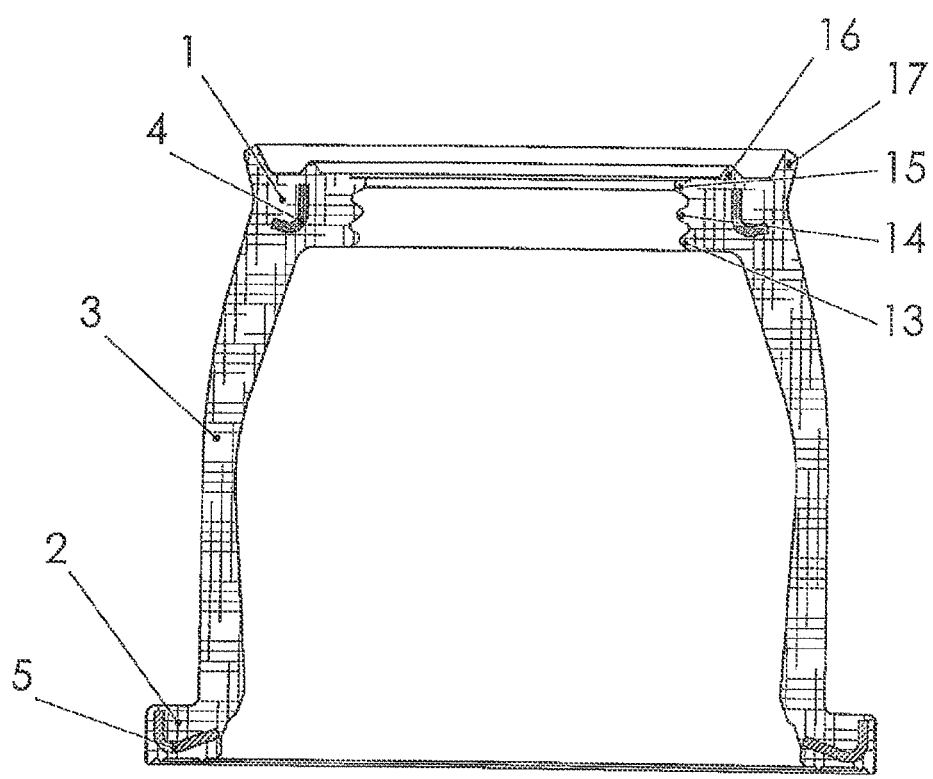
FIG. 3 shows the sealing bellows of FIG. 1 during production thereof subsequent to the first step of the method, having a cylindrical casing.
Figure 4:
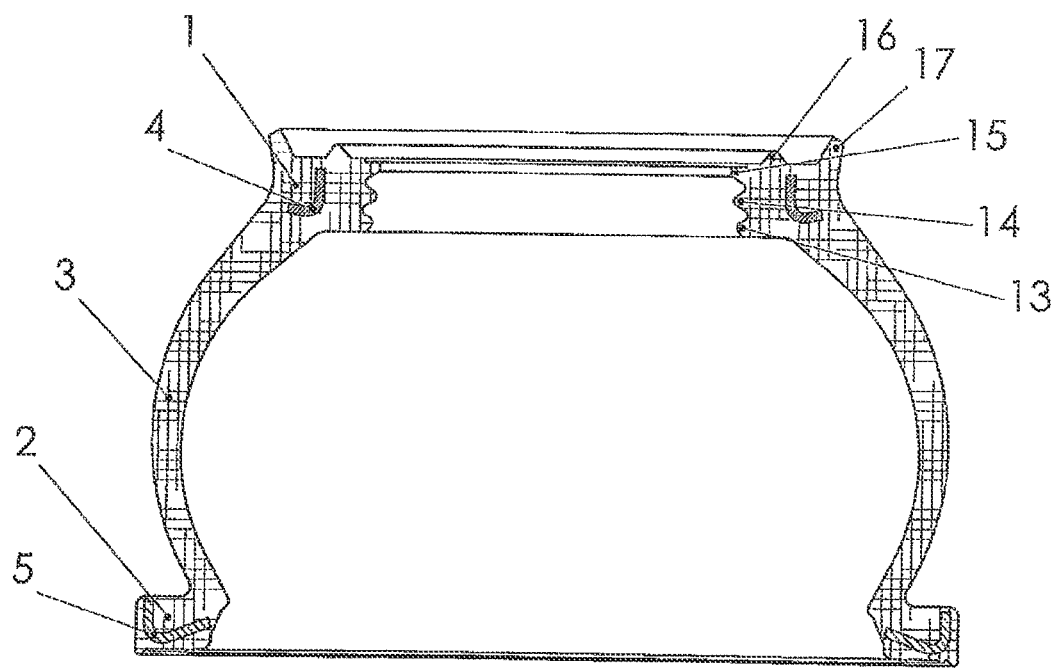
FIG. 4 shows the sealing bellows of the invention according to FIG. 1 after production thereof, having a substantially spherical shape as a condition of production.

In principle, the method firstly consists of the injection molding of a sealing bellows having a cylindrical casing 3, as shown in FIG. 3, and the subsequent blow molding of this sealing bellows, which then has the form shown in FIG. 4, as a condition of production.

In a first step of the method, a sealing bellows is initially produced, as shown in FIG. 3. The sealing bellows comprises the sealing region 1 and the attachment region 2, a respective clamping element 4, 5 being integrated into the two regions 1, 2.

A sealing bellows of this type is produced by a vulcanization forming process, for example by an injection molding process. After the mold cavity has been filled and the dimensional stability of the sealing bellows has been attained, the vulcanization process is initially interrupted and the sealing bellows is then released from the mold. The bellows is then in the form shown in FIG. 3.

In a second step of the method, the sealing bellows with its substantially cylindrical casing 3 is introduced into a heated blowing mold having a substantially spherical cavity. The blowing mold is then sealed in an airtight manner and in a third step, the interior of the sealing bellows which, up until then has been substantially cylindrical, is subjected to a relative excess pressure. As a result, the initially cylindrical casing 3 is applied against the wall delimiting the substantially spherical cavity of the blowing mold. In the fourth step, the sealing bellows is completely cured, the blowing mold is then opened and the sealing bellows with the substantially spherical casing 3, conditioned by production, is released from the mold.

A sealing bellows, produced in this manner, in its production-conditioned and ready-for-use form is shown in FIG. 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of producing a sealing bellows, the method comprising:
   producing, using vulcanization, the sealing bellows including a sealing region, an attachment region, and a substantially cylindrical casing that is disposed, in an axial direction of the bellows, between the sealing region and the attachment region, the sealing region being formed with an integrated first clamping element, and the attachment region being formed with an integrated second clamping element;
   interrupting the vulcanization after a mold cavity for the sealing bellows has been filled and after dimensional stability of the sealing bellows has been attained, and releasing the sealing bellows from the mold cavity;
   introducing the sealing bellows with the substantially cylindrical casing into a heated blowing mold having a substantially spherical cavity, the blowing mold being sealed in an airtight manner;

subjecting an interior of the sealing bellows with the substantially cylindrical casing to a relative excess pressure such that the casing is applied against a wall delimiting the cavity of the blowing mold and thereby forms a substantially spherical casing;

completing the vulcanization of the sealing bellows; and then opening the blowing mold and releasing the sealing bellows having the substantially spherical casing from the blowing mold.

2. The method of claim 1, wherein the sealing bellows with the substantially cylindrical casing is formed by an injection molding process, and wherein the vulcanization takes place in the mold cavity after the injection molding process.

3. The method of claim 1, wherein the subjecting of the interior of the sealing bellows is performed using compressed air.

\* \* \* \* \*